United States Patent [19]
Dean et al.

[11] Patent Number: 5,914,757
[45] Date of Patent: Jun. 22, 1999

[54] SYNCHRONIZATION OF MULTIPLE VIDEO AND GRAPHIC SOURCES WITH A DISPLAY USING A SLOW PLL APPROACH

[75] Inventors: John D. Dean, Stormville, N.Y.; Richard C. Shen, Leonia, N.J.; Alan P. Cavallerano, White Plains, N.Y.

[73] Assignee: Philips Electronics North America Corporation, New York, N.Y.

[21] Appl. No.: 08/843,807

[22] Filed: Apr. 21, 1997

[51] Int. Cl.$^6$ ...................................................... H04N 9/74
[52] U.S. Cl. ........................ 348/584; 348/564; 348/598; 348/537; 348/567
[58] Field of Search ...................................... 348/505, 512, 348/536, 537, 564, 565, 567, 568, 584, 588, 598; H04N 5/45, 9/74

[56] References Cited

U.S. PATENT DOCUMENTS

| | | | |
|---|---|---|---|
| 4,970,596 | 11/1990 | Johnson | 358/183 |
| 5,155,595 | 10/1992 | Robinson | 348/565 |
| 5,414,470 | 5/1995 | Hotta et al. | 348/530 |
| 5,418,573 | 5/1995 | Basile et al. | 348/536 |
| 5,420,641 | 5/1995 | Tsuchida | 348/565 |
| 5,473,385 | 12/1995 | Leske | 348/536 |

FOREIGN PATENT DOCUMENTS

| | | | |
|---|---|---|---|
| 0601647A1 | 6/1994 | European Pat. Off. | G09G 1/16 |
| 710016 | 5/1996 | European Pat. Off. | |

*Primary Examiner*—Sherrie Hsia
*Attorney, Agent, or Firm*—Steven S. Rubin

[57] ABSTRACT

A slow Phase Locked Loop (PLL) is utilized to prevent an abrupt change to a video display containing multiple images, when the source of the synchronization is changed. Such displays include Picture in Picture (PIP) television systems and computer displays. By appropriate buffering and memory management, visual disruptions can be minimized by slowly synchronizing the display synchronization signals to the new synchronization source. The slow synchronization also produces a less disruptive visual image when the source, or channel, of a single image display is changed, and allows for smooth visual transitions on displays having inertial elements, such as color wheels.

12 Claims, 4 Drawing Sheets

SYNCHRONIZATION OF MULTIPLE VIDEO AND GRAPHIC SOURCES WITH A DISPLAY USING A SLOW PLL APPROACH

BACKGROUND

1. Field of the Invention

This invention addresses the synchronization of alternative sources of video to a video displays particularly a television or computer monitor. Display devices must be capable of displaying a variety of video formats, and of displaying multiple video images simultaneously.

The use of a Phase Lock Loop having a slowly changeable frequency and phase is shown to be effective for the synchronization of differing and simultaneous video images to a display device.

2. Discussion of the Prior Art

Sources of video information include conventional television signals, such as NTSC and PAL; advanced digital televisions such as ATV and HDTV; computer graphics and animations; and others. Each of these sources have different characteristics, such as the number of frames per second to be displayed. A display device designed to accommodate each of these formats would typically contain some means, such as a phase locked loop, to synchronize the display to the source signal. To be effective, this synchronization must address two aspects of the source signal: its frequency and its phase. The frequency must be synchronized to maintain the proper display rate. The phase must be synchronized to assure the proper correspondence between the source image and displayed image; for example, to assure that the top of each source scene is displayed at the top of the display device, or at the top of its associated display area within the overall display device area.

Although two signals from sources which conform to a particular standard can be expected to have the same nominal frequency, they may well be asynchronous to each other with regard to phase. Thus if the display is synchronous with a first source, it will not necessarily be sychronous to a second source. The synchronization of the second source to the display is typically accomplished by delaying or buffering the second source to compensate for any phase differences. The effects of the asynchronous phase among alternative sources becomes apparent whenever the source of the signal is changed, and the display circuitry attempts to synchronize the display to the new source. This resynchronizing is, for example, the cause of the momentary loss of signal, or "jump" of the image, when a viewer changes channels on a conventional television receiver. Although most viewers may have become acclimated to this disruption during channel changing, the disruption is particularly troublesome for less conspicuous channel changes. For example, consider a viewer of a television with Picture-In-Picture (PIP) who chooses to display the PIP as the main image. To the viewer, this is a mere enlargement; but, in reality, it is similar to changing the channel, because, in a PIP television, the display is synchronized to the source of the main image. When a viewer chooses the PIP image as the main image, the display must be resynchronized to this new source signal, with the corresponding momentary loss of signal, or image jump, caused by an abrupt change of phase.

Two signals from sources conforming to different standards can be expected to differ in both frequency and phase. A display device must accommodate for each, and, must allow for both to be viewed simultaneously. In the above PIP scenario, the formed sub-image must be both frequency and phase synchronized to the main image. Typically, this is accomplished by providing a memory, or buffer for adjusting the rate and phase of the received sub-image relative to the display. The buffer is written to as it is received, and the information in the buffer is extracted in sync with the display. If the display frequency (read clock) is greater than the source frequency (write clock), the buffer will be read faster than it is written to. At some point there will be no new data available to be displayed. Typically, the system would be designed to redisplay the prior image, resulting in periodic pauses in the displayed motion. If the display frequency is less than the source frequency, the buffer will be written to faster than it is displayed. Assuming a finite buffer size, eventually the buffer will become full. Typically, the system would be designed to periodically skip an image for display, resulting in periodic jumps in the displayed motion. For example, if the source frequency is 70 Hz and the display frequency is 60 Hz, the system would be required to skip the display of every seventh frame, to equalize the source and display rates. This repetitive skipping or repeating of a frame is commonly termed "judder".

As noted above, most systems are designed to adjust the display frequency and phase to match the frequency and phase of the source of the primary video image. In this way, the primary image is free of the judder caused by a difference between the display rate and the primary image frame rate. Thus, when the source of the primary signal is changed, the display must be resynchronized to the new source.

One would expect a display device to be able to accommodate a change of signal source quickly. It would be unacceptable, for example, for a PIP television to lose the signal for a noticeable period of time, while the circuitry resynchronizes to a changed frequency or phase. Thus, most televisions and other monitors employ means for rapidly resynchronizing to a changed source, typically by the use of Phase Locked Loops (PLLs) which can rapidly lock to a changed signal, as discussed in U.S. Pat. No. 5,473,385. Traditionally, without the use of a fast PLL, a change of channel on a television would result in visual disturbances in the new image, such as "rolling" and "tearing" until phase and frequency synchronization is established. Conversely, using a fast PLL causes a momentary, but highly noticable, loss, or jump, of the video image, as a natural consequence to the fast reaction of the circuitry to this changed video source. As stated in the aforementioned '385 patent. "the interference is not objectionable because the viewer expects the brief disturbance during turn on and channel changes."

The change of source of video images with become increasingly common, even if the viewer does not explicitly change the channel or expand a PIP. Under the newly adopted ATV (Advanced Television, including conventional TV and HDTV) standards, providers of services will have the ability to "splice", for example, commercials specifically targeted for a particular viewing area. Thus, the "source" of a video image on a single television channel may, in fact, be a composite of multiple sources, each at their own frequency and phase. Although the aforementioned standards include provisions for "seamless splicing", a poor splice will result in the jumps typically associated with a change of channel.

Further compounding the problem, some "displays" have inertial elements which preclude their rapid resynchronization. Some projection display systems incorporate color wheels which spin in synchronization with the color decoding process, as presented in EP 0710016-A2. White light is projected to and through a portion of this wheel, synchronized to the color which is to be projected at that particular time. A change of the source of the video necessitates a resynchronization to the new source. During this resynchronization period, improper colors will be displayed unless means are provided to synchronize the new source to the spinning wheel quickly. Traditionally, this is accomplished by maintaining a constant spin rate, and buffering the source, as discussed above with regard to a constant display rate. This fixed display rate solution, however, has the deficiencies discussed above when the source rates may differ, or when the aforementioned ATV composite signal is improperly spliced. As discussed in the aforementioned EP '016 patent, this constant display rate may be selectable by the user, or may be derived from knowledge of the format of the primary source. The selection of a new display rate will cause the visual artifacts discussed above with regard to a selection of a new image source.

Computer displays also require synchronization to multiple signal sources. As typified by U.S. Pat. No. 5,155,595, it is common to place one video image within another on a computer screen, similar to PIP television. In U.S. Pat. No. 5,155,595, a phase locked loop is used to synthesize a clock which synchronizes the horizontal sync frequency of the smaller image to that of the larger image. A separate phase locked loop circuit is used to synchronize the vertical sync frequencies. If the source of the larger image changes frequency, display activity is paused until the system reestablishes synchronization. If the vertical signals are out of phase, a reset signal is asserted to reinitialize both the larger and smaller images' vertical line controls, thereby forcing a vertical resynchronization. The horizontal sync signal, being significantly faster than the vertical sync signal, is utilized to establish synchronization so that such synchronization can be accomplished quickly, minimizing the time the screen is frozen. Once horizontal synchronization is established, a reset signal is utilized in order to minimize the time required to reestablish vertical synchronization. That is, a change of the source of an image on a typical computer display results in a momentary 'freeze' of the image until synchronization is reestablished, followed by a jump of the image to its resynchronized state Although this phenomenon may be acceptable for text and graphics, it is likely to be found unacceptable for full motion video and multimedia applications.

SUMMARY OF THE INVENTION

The object this invention is to provide a means of rapidly displaying a video image in response to a change in the source of the image, without causing a loss, or jump, of the video image. Through the use of a PLL with slowly changeable frequency and phase, and appropriate memory management, a seamless transition between images may be effected.

By employing a slowly changeable PLL, the frequency and phase of the display synchronization signal (hereinafter "display sync") is held relatively constant after a transition to another source. Thus, the advantages of a constant display frequency can be realized. By allowing the frequency and phase of the display to gradually change, through the operation of the PLL, the disadvantages of a constant display frequency are eliminated, once the PLL achieves the new frequency and phase.

DETAILED DESCRIPTION OF THE PREFERRED EMBODIMENTS

Figure 1:
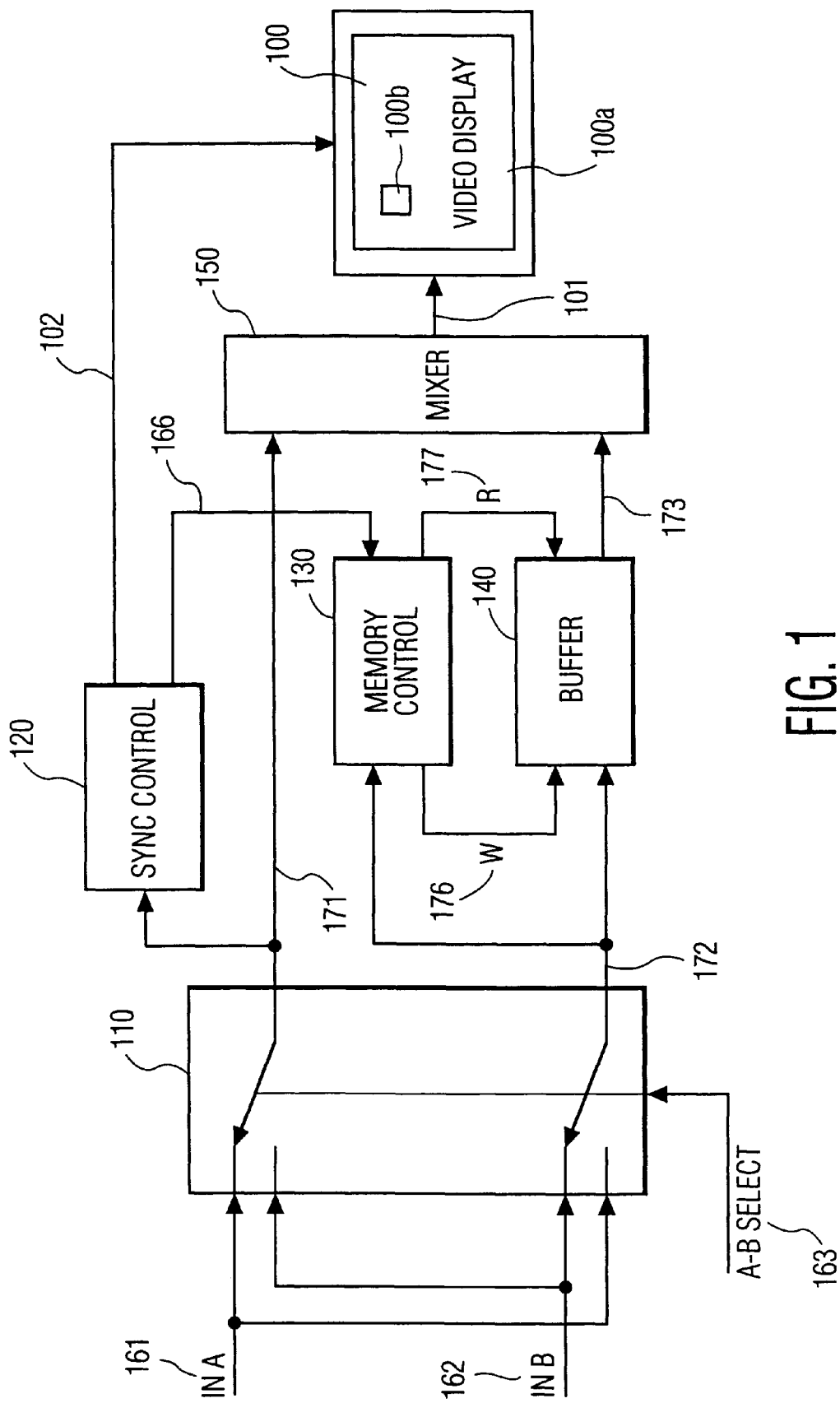
FIG. 1 shows a prior art Picture-In-Picture (PIP) display system.

FIG. 1 shows a display system which allows for the display of images from two sources, as would be typified by a television with Picture-In-Picture (PIP) capability. As shown in FIG. 1, a typical PIP display 100 would contain a larger image 100*a* within which a smaller image 100*b* would appear. Alternatively, a dual display system may display the two images side by side, or in some other composite fashion. For the purposes of this disclosure, one of the images will be referred to as the 'primary' image, or 'PIP containing' picture, corresponding to the larger image 100*a* of FIG. 1; and the other image as the 'secondary' images 'PIP contained', or simply the 'PIP' picture. In FIG. 1 the two channel inputs are IN-A 161 and IN-B 162, which in a typical system would have been derived from two television channel tuners (not shown); such signals may have come from two independent sources of video images, as well, such as a video camera and a computer device. A user selects which of the two inputs is the primary channel input, and which is the secondary. On a PIP display, for example, this selection determines which of the two channels is contained within the other. Such a system would also contain means (not shown) for determining and controlling the size and respective locations of each of the images. A typical system may also contains means (not shown) for downsampling the images to conform to the size of the respective image locations within display 100.

The two channel inputs 161, 162 are input to switch 110, and form the primary video signal 171, and the secondary video signal 172. The user's selection of which channel input forms the primary video signal, and which forms the secondary video signal is effected via the A-B select signal 163 to switch 110. In the first position, the switch directs IN-A 161 to the primary video signal 171 and IN-B 162 to the secondary video signal 172; in the other position, the switch directs IN-B 162 to the primary video signal 171, and IN-A 161 to the secondary video signal 172. As discussed above, traditional PIP systems synchronize the video display to the input channel selected as the primary. Sync control block 120 derives the synchronization signal 102 required for the video display 100 from the primary video signal 171. Sync signal 102 typically comprises synchronizing signals for horizontal, vertical, and color synchronization. Sync control block 120 also derives a memory synchronization signal 166, which is used to synchronize the display of the secondary video signal, as will be discussed below.

The mixer block 150 formulates a composite video image 101; this image is a composite of the primary and secondary video signals, arranged to be properly displayed on the video display. Typically, a video display displays each line of the image sequential by, either one after the other, or interlaced, wherein every other line is displayed, from top to bottom, then the alternate every other lines are displayed from top to bottom. The memory control 130, the mixer 150 and the display 100 operate in concert, as will be subsequently discussed. The mixer 150 presents the appropriate portion of the image to be displayed at the time the display requires it. The mixer 150 substitutes a buffered secondary video signal 173 for the primary video signal 171 at each of the times when the video display is to display the portion 100*b* of the primary image 100*a* which is overlaid by the PIP image.

In order to properly present the secondary image in the region 100*b*, the secondary video image must be synchronized to the display. This synchronization is accomplished by the use of a buffer 140. As discussed above, if the primary and secondary inputs are at the same frequency, the phase synchronization of the secondary to the display is accomplished by adjusting the time the secondary video signal is presented to the mixer 150. The memory controller 130 provides this adjustment. The memory controller derives a write signal 176 which is synchronized to the secondary video signal 172. In deriving this signal, the memory controller device will also determine image related parameters, such as the start of each frame of the secondary image. The memory controller is also provided the memory synchronization signal 166, which is derived from the primary video signal 171. This memory synchronization signal comprises parameters related to the display of the primary video image, such as the start of each line. The memory controller derives a read signal 177 which is at the same frequency as the primary video signal, and synchronized to occur at the appropriate times, relative to the display of the primary video image. That is, for example, at the first line of the primary image upon which the secondary image is to appear, the read signal 177 is derived so as to present the first line of the secondary image. In so doing, the start of the secondary video image frame appears at the top of the overlaid PIP image area 100b.

Typically, the secondary image 100b is significantly smaller than the primary image 100a. The memory controller 130 also includes means for decimating the secondary image into a smaller image for display. This can be accomplished by controlling the write signal 176 so as to store fewer lines into the buffer 140, each being a subsample of the original secondary image line. Alternatively, the entire secondary image may be written into the buffer 140, and the read signal 177 controlled so as to read out fewer lines from the buffer 140, each being a subsample of the buffered secondary line. Alternative means for synchronizing and decimating the secondary image for a PIP display are well established and known in the art.

The memory controller 130 also comprises means for compensating for a difference in frequency between the primary and secondary channel inputs. If the secondary video signal 172 has a faster frame rate than the primary video signal 171, the secondary video signal 172 will be written to the buffer 140 faster than the corresponding buffered secondary signal 173 is read out. The memory controller 130 will be designed to adjust the read signal 177 appropriately to skip ahead by a frame whenever the buffer 140 approaches being full. Similarly if the secondary video input 172 has a slower frame rate than the primary video input 171, the buffer 140 will be read faster than it is written. When the buffer approaches being empty, the memory controller 130 will adjust the read signal to skip back by a frame, and the prior read frame will be read again. As stated above, this skipping and repeating of frames produce a visually disturbing effect, "judder", in the PIP image.

Consider now a channel select change. If the user modifies the selection of primary and secondary signals via the switch 110, the prior secondary video signal will become the primary video signal and vice versa. The sync control 120 will have a new input as primary video signal 171, and will generate synchronization signals 102 and 166 which are synchronous to the new video signal source. The primary and secondary video images will be out of sync with the display until the sync control 120 generates these synchronization signals in phase with this new primary video signal 171. To minimize the delay in producing recognizable images on the video display, traditional PIP display systems employ very fast synchronization means within sync control 120, typically Phase Locked Loops (PLLs) with a very fast response time. This fast response causes abrupt changes to the display frequency or phase, causing visually disturbing jumps of the image. In a traditional PIP display system, the Memory Control 130 also includes a means for rapidly synchronizing the buffered secondary signal, typically via the use of reset signals and the like.

Thus it is seen that a traditional PIP display system will produce a visually disturbed image each time the user alternates between the choice of which channel is to appear as the primary, rather than secondary, PIP, channel. Also note that the displayed secondary image will also be visually disturbed whenever the user changes the primary channel input. To avoid the visually disturbing effects, traditional television systems blank out the entire image during the transitions between primary input changes; the screen goes dark, then illuminates when the display is synchronized to the new primary channel. Preferably, if the user is changing the primary channel, but has not changed the secondary, PIP, channels the portion of the screen containing the PIP image, 100b, should remain illuminated, synchronized with the display. Such a preferred operational feature is not feasible with the traditional PIP display system shown in FIG. 1, because the sync control introduces abrupt changes to the display frequency or phase.

Figure 2:
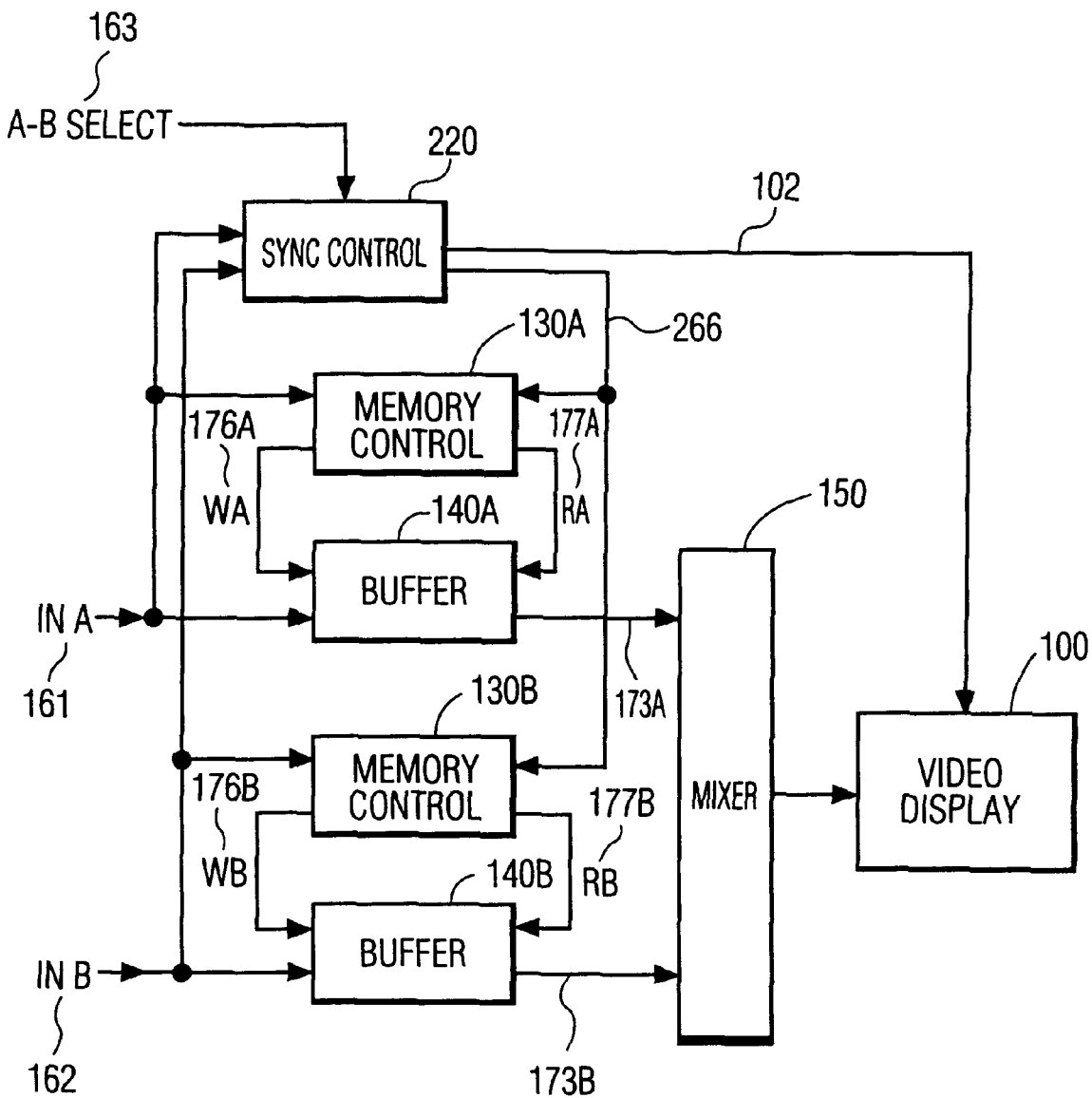
FIG. 2 shows a Picture-In-Picture display system in accordance with this invention.

FIG. 2 shows a PIP display in accordance with this invention. Items in FIG. 2 which are similar to those in FIG. 1 have the same identifying numerals. As contrast to FIG. 1, in accordance with this invention, each input channel in FIG. 2 contains a memory control and buffer. The first channel input, IN-A 161, has an associated memory control 130A and buffer 140A; the other channel input, IN-B 162, has an associated memory control 130B and buffer 140B. Both channel inputs 161 and 162 are also provided to sync control 220. Sync control 220 provides display synchronization signal 102 for synchronizing the video display 100, and memory synchronization signal 266. The operation of the sync control 220 will be discussed following; of significance at this point is that the synchronization signal 266 is provided to both memory controls 130A and 130B simultaneously. Memory synchronization signal 266 is synchronized to display synchronization signal 102, and conveys the appropriate information, such as the start of each display frame, to each of the memory controls 130A and 130B. Each memory control operates as discussed above to synchronize the read operations of each buffer to match that of the display. Read signals RA 177A and RB 177B are offset in time relative, respectively, to write signals 176A and 176B, to compensate for phase differences between the display synchronization signal 102 and each of the channel inputs, independently. The memory controls 130A and 130B also include means of skipping and repeating frames to compensate for frequency differences between the video display rate and the frame rate of each of the channel inputs IN-A 161 and IN-B 162. In dependence upon the read signals RA 177A and RB 177B, the buffers 140A and 140B operate to provide the appropriate buffered video image signals 173A and 173B to the mixer 150. Note that both buffered video signals 173A and 173B are synchronized to the memory synchronization signal 266, and hence to the display synchronization signal 102.

Contrasted to the traditional PIP display system of FIG. 1, neither buffered video signal is synchronized, per se, to one of the channel inputs, and thus, a change of the source of one channel would not affect the display of the other. That is, the changing of the source of the PIP enclosing image does not require a resynchronization of the PIP enclosed image to this new source, and thus the PIP enclosed image can be continually displayed while the PIP enclosing image is changed. Further, if the synchronization signal 266 maintains a constant frequency and phase throughout the transition period, the alternation between which channel is the PIP enclosed or PIP enclosing image will not require a resynchronization, because both are synchronized to this constant frequency and phase signal.

Note however, as in FIG. 1, a difference in frame rate between synchronization signal and either input channel will result in that input channel's memory control having to skip or repeat frames, which will produce a visually disturbing judder of the image associated with that channel input. Preferably, the system should be designed to minimize judder on at least one channel. In FIG. 1, for example, the display is synchronized to the selected primary channel, and therefore the associated primary image will have no judder. In FIG. 2, if synchronization signal 266 is synchronous with IN-A 161, the portion of the video display associated with IN-A will have no judder, regardless of whether IN-A is the PIP enclosed or PIP enclosing image.

Preferably, synchronization signal 266 should be synchronous with the source of the image most noticeable to the user. Typically, in a PIP display system synchronous signal 266 should be synchronous with the larger, PIP enclosing, image. In so doing, any judder caused by differing frame rates will be limited to the smaller, PIP enclosed, image, and will therefore be less noticeable to the user. In a multi-source computer display, on the other hand, the synchronization signal 266 should be synchronized to the image currently receiving the "focus" of the user's attention; typically, the most recently accessed "window" on the display. Alternatively, the synchronization signal 266 could be synchronized to the channel having the most activity, because judder is only noticeable on moving images. A skipped or repeated frame is virtually unnoticeable if that frame is the same as the frames before and after it.

Given the above mentioned desired characteristics of synchronization signal 266, the operation of the sync control 220 is paradoxical. To minimize video judder, the synchronization signal should match the frequency of whichever source is considered the focus of the user's visual attention at that time. To minimize video jumps, the synchronization signal should maintain a constant frequency, particularly when the focus of the user's attention changes. That is, the frequency of the synchronization signal should be constant, yet changeable, yet shouldn't change in such a manner so as to introduce detectable changes in the displayed video images. In accordance with the invention, a preferred embodiment to achieve the desired operation of sync control 220 is a Phase Locked Loop with a slow response time.

Phase Locked Loops are well known in the art, and are characterized by a nominal center frequency, a range or bandwidth, and a response time. The response time is the time required for the PLL to lock on to an input signal at a frequency which is within the specified range of the nominal center frequency. In the preferred embodiment, the input to the PLL is the vertical sync signal contained within the video image, which identifies the start of each new video frame. The PLL nominal center frequency is the nominal center frequency of the display frame rate, and the PLL range is equal to the range of the display frame rates, for ease of implementation. Computer images are typically displayed at greater than 70 Hz, and traditional NTSC televisions signals have an interlaced field rate of about 60 Hz. In a preferred embodiment, a center frequency of 70 Hz, and a range of 15 Hz would be utilized for a computer monitors designed to display NTSC television images. The response time of the PLL is not critical, but should be in the order of a few seconds, in order to minimize the appearance of video jumps as the synchronization source is changed, as discussed above.

Figure 3:
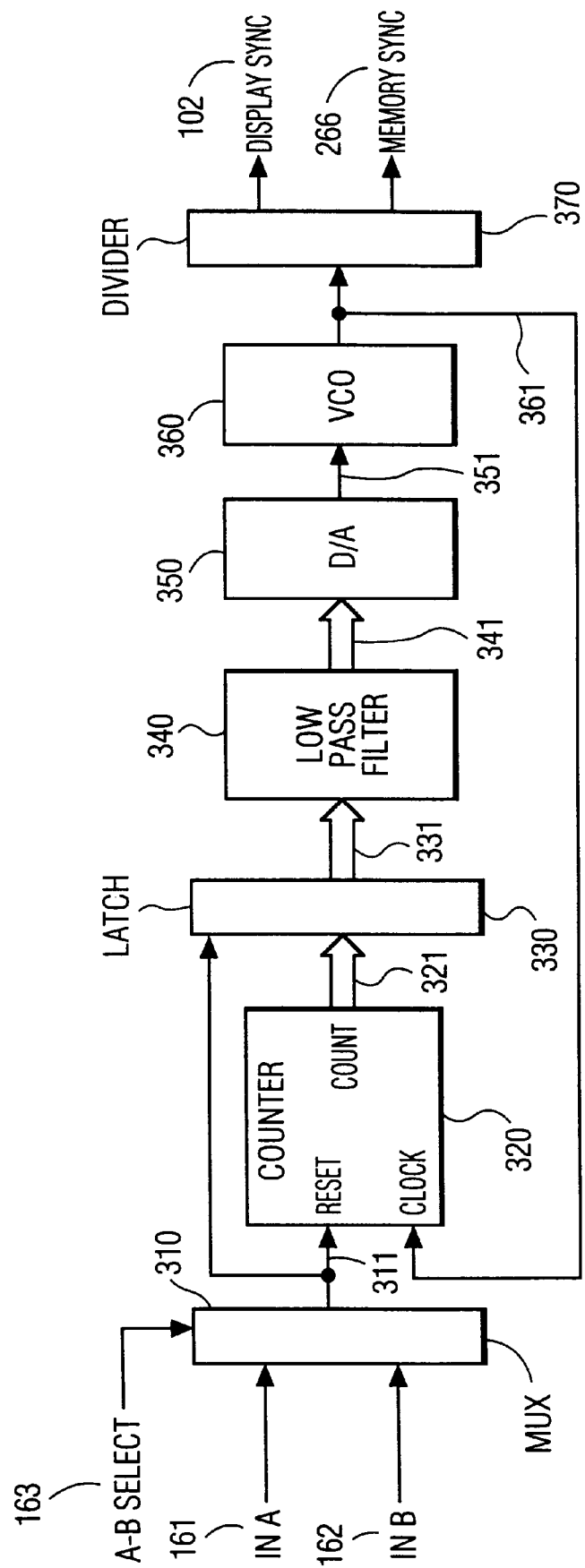
FIG. 3 shows a Phase Locked Loop in accordance with this invention.

FIG. 3 shows a block diagram of a preferred embodiment of a PLL in accordance with this invention. In the absence of an input, the voltage controlled oscillator, VCO 360, generates a clock signal 361 at a frequency which is a large multiple, N, of the nominal PLL center frequency. This clock signal 361 is also the source of the synchronization signals 102 and 266, via the divider 370. The multiple N determines the resolution to which the PLL can be adjusted, and should be chosen to be high enough to derive the highest frequency synchronization signal required for the display 102 or memory 266 synchronization functions. In the preferred embodiment, the required upper frequency is dependent upon the number of pixels contained in each frame, because the memory read signals 177, which are derived from memory synchronization signal 266, are used to extract each pixel value from the buffers 140A, 140B. In the preferred embodiment, assuming a display with a resolution of at least 2 million pixels (for a 1600×1200 pixel display), N should be at least 2 million. The counter 320 is designed as a count-to-N counter; for ease of implementation, N may be selected as a power of two which is above the desired minimum. The nominal frequency of the VCO 360, is designed to be N times the nominal PLL center frequency, with an adjustable range of at least N times the PLL range.

A-B select signal 163 selects which of the two inputs 161, 162, will be used for synchronizing the display, via the multiplexor 310. A-B select signal 163 may be generated by a controller (not shown) in response to a user selection, or in response to an assessment as to which input is most appropriate to use, as discussed above. The multiplexor extracts the appropriate synchronization signal from the selected input; in the preferred embodiment, the multiplexor extracts a signal corresponding to the start of each frame of the selected signal. The output 311 of the multiplexor is used to reset counter 320 to zero at the start of each frame. It is also used to retain the count 321 of the counter 320 immediately prior to this reset, via latch 330. Being a count-to-N counter, the counter 320 will cycle back to zero after each N occurrences of the clock 361 since it was last reset to zero. Thus, if the VCO is running slightly faster than N times the input frame rate, it will have cycled back to zero prior to the occurrence of the reset signal 311, and a low count number will be latched into latch 330. If the VCO is running slightly slower than N times the input frame rate, it will not yet have recycled, and a very large count number will be latched into latch 330. In two's complement notation, a count of N−1 is equivalent to a negative one; a count of N−2 is a negative two; etc. Thus, the latched count will be indicative of the magnitude and direction of the difference between the PLL cycle rate and the input frame rate Low pass filter 340 and digital to analog converter 350 convert this latched count 331 into an adjustment signal 351 which subsequently adjusts the VCO frequency in the opposite direction as the latched count. Thus, a low count in latch 330 will result in a decrease in the VCO 360 frequency, and a high count (a negative number) will result in an increased frequency. When the VCO and the selected input are in synchronization, of both frequency and phase, the counter will be recycled to zero just prior to the occurrence of the reset signal 311, and a zero will be latched into latch 330, and the VCO frequency will not be affected.

The low pass filter 340 and D-A converter 350 are designed to generate an adjustment signal 351 in slow response to the latched count 331. Because of the slow response required, the function of these blocks may be accomplished via software in a controller (not shown).

The operation of this Phase Locked Loop in accordance with this invention to produce a synchronization signal which gradually changes is as follows. The low pass filter (LPF) is designed to generate an output 341 based upon the long term characteristics of its input signal, the latched count 331. Consider, for example, an initial synchronous state, such that the latched count 331 is consistently at or near zero. If the input channel is changed, producing a large latched count 331, the LPF output signal 341 would remain small, because the long term characteristic of the input had been at or near zero. In response to a small LPF output signal, the VCO 360 is only very slightly adjusted. The next frame's latched count 331 will be only slightly smaller in magnitude, because of the slight adjustment to the VCO. The LPF output signal would continue to be small, but a bit larger, because of the two occurrences of a consistent latched count 331. Each frame will produce a slightly larger LPF output 341, representative of the long term, rather than transient, occurrences of a large latched count. Gradually, the VCO will change sufficiently to reduce the latched count 331, which will then result in a leveling off, and then decrease, of the LPF output 341. Eventually, assuming the newly selected channel remains selected the accumulation of these very small changes in each frame will result in the VCO being adjusted and synchronized to the selected input channel. During this time, the display and memory synchronization signals, 102 and 266 respectively, track this slow change of the VCO frequency. The memory controllers 130 operate in synchronization with memory synchronization signal 266, and slowly adjust the read signals 177 to present the images in synchronization with the slowly changing display synchronization signal 102. The memory controllers 130A, 130B accommodate for a difference in reading and writing rates to the buffers 140A, 140B by skipping or repeating frames as required during this resynchronization period, as discussed above. Note that throughout this process, all changes are introduced gradually, so that an abrupt change in the display frequency or phase does not occur.

Thus, it is seen that the use of a slowly changing PLL within sync control 220 achieves the object of the invention by maintaining a constant frequency when the synchronization source is changed, to eliminate video jumps, and by adjusting its frequency to the selected source slowly, to gradually eliminate judder on the primary channel. During this synchronization process, the display and the memory remain in synchronization with synchronization signal 266, and neither image exhibits a video jump because signal 266 is prevented from changing abruptly. An Input source which is not synchronized to the display will exhibit judder if its frequency is not that of the display. When this input is selected to be the synchronizing input, it will continue to exhibit judder, but at a gradually decreasing rate, until the VCO frequency is adjusted as discussed above. Upon achieving synchronization, the selected input will not exhibit judder.

Note further that this invention is particularly well suited for display systems comprising inertial elements, such as color wheels. Because no abrupt changes are introduced, the inertial element remains in sync with the synchronization signal 266 throughout the transition period. In the preferred embodiment, the response time of the sync control element would be consistent with the inertial element's ability to accelerate or decelerate without causing visually disturbing effects.

Although the presentation of this invention has been in the context of a PIP display, having two sources of input signals, it is readily apparent that this invention is equally effective for devices having one input, or multiple inputs. On a single input system, the use of this invention will eliminate the visually disturbing jump of the image as the user changes channels. An abrupt change to the channel input will not introduce an abrupt change to the video display synchronization signal, and the new channel input will be displayed in synchronization with the relatively constant synchronization signal 266. This non-disruptive display feature will also be apparent when different video sources are spliced into the same channel. The change of source will not introduce an abrupt change in the synchronization signal, and the spliced segments will be presented without a visual disruption at the splice point.

Figure 4:
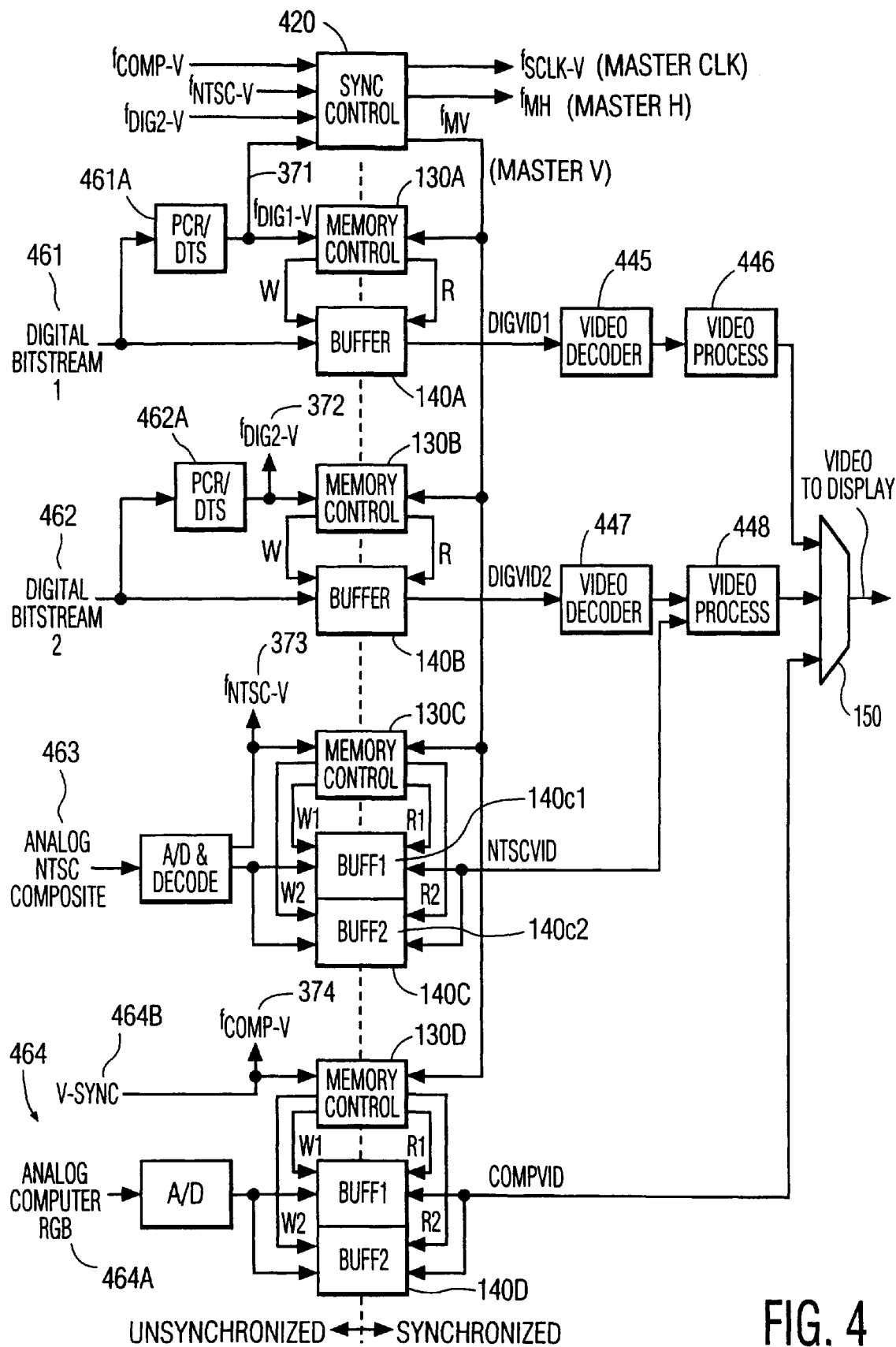
FIG. 4 shows a multiple input video system in accordance with this invention.

A multiple input system is shown in FIG. 4. The input channels, 461 through 464, may each have a different format. For those signals which contain frame markers within the channel signals, means are provided in the associated blocks 461A through 463A to extract an appropriate synchronization signal 371 through 373. Traditional analog computer RGB signals, 464, contain a separate V-sync signal 464B, which forms synchronization signal 374. Suitable means are provided in the sync control block 420 to select one of the synchronization signals 371 through 374 for synchronizing the display and memory elements.

As shown, alternative embodiments can be employed, consistent with this invention. The buffer 140C associated with the composite NTSC input channel 463 is shown to comprise two buffers 140C1 and 140C2, with one memory controller 130C controlling both. This embodiment enables a PIP composite picture to be handled, effectively, as a single input source within this multiple input system. That is the concepts presented herein can be applied hierarchically, to produce images within images within images, and so on. Also shown are video decoding and processing blocks 445 through 448, between the buffers 140A, B, C, and D and the mixer 150. Such a configuration allows for the video images to be processed and stored in an optimized form, for example, as compressed video, for synchronization purposes, then presented in detailed form, for example, as uncompressed video, for display.

The blocks presented in FIGS. 2 through 4 are representative of their function and their intended effect. As is evident to one skilled in the arts the same function and/or effect may be realized by alternative blocks and arrangements, consistent with this invention. For example, a device which is slowly responsive to a change of input frequency is consistent with the teachings of this invention, even if not realized in physical or structural form as a Phase Locked Loop, per se. A flywheel, for example, could be employed to spin at a relatively constant rate, and its inertia could provide for the slowly responsive effects desired in accordance with this invention. Similarly, a computer program which slowly adjusts an output frequency in response to one or more input frequencies is also consistent with this invention, without regard to the specific algorithm employed. The low pass filter and digital to analog converter of the example PLL could be implemented as a simple sign detector, producing one value if the latched count is positive, and another if the latched count is negative. The separate buffers could comprise a single memory block, with appropriate memory management and control. The sync control could comprise memory management functions, and may generate the appropriate read and write controls directly. The read and write functions could be controlled by separate controllers. And, the function of the sync control, memory control, and video processing and mixing could all be embodied in a single controller function.

The foregoing merely illustrates the principles of the invention. It will thus be appreciated that those skilled in the art will be able to devise further arrangements which, although not explicitly described or shown herein, embody the principles of the invention and are thus within its spirit and scope.

We claim:

1. A method of synchronization of one or more video sources to a display, comprising the steps of:
   generating a clock signal having a frequency and a phase,
   buffering each of said video sources via one or more memory devices,
   selecting one of said video sources as a primary source,
   adjusting said clock frequency in dependence upon said primary source,
   synchronizing the display to said clock frequency and clock phase, and,
   extracting each of said video sources from said memory devices in dependence upon said clock frequency and clock phase,
   characterized in that said adjusting of the clock frequency is performed in such a manner that no discernable discontinuities are introduced in the clock frequency, nor in the clock phase.

2. An apparatus for synchronization of one or more video sources to a display, comprising:
   means for generating a clock signal having a frequency and a phase,
   means for buffering each of said video sources via one or more memory devices,
   means for selecting one of said video sources as a primary source,
   means for adjusting said clock frequency in dependence upon said primary source,
   means for synchronizing the display to said clock frequency and clock phase, and,
   means for extracting each of said video sources from said memory devices in dependence upon said clock frequency and clock phase,
   characterized in that said means for adjusting the clock frequency produces no discernable discontinuities in the clock frequency, nor in the clock phase.

3. An apparatus as claimed in claim 2, wherein
   said means for adjusting the clock frequency comprises a Phase Locked Loop device.

4. An apparatus as claimed in claim 3, further characterized in that said Phase Locked Loop device has a response time in the order of a few seconds.

5. An apparatus for synchronization of one or more video sources to a display, each of said video sources having an associated source frame rate, and said display having a video display rate and a video display phase, said apparatus comprising:
   a buffer associated with each of said video sources
   a sync control comprising:
      means for selecting one of said video sources as a primary signal, and,
      means for generating a display synchronization signal and a memory synchronization signal in dependence upon said primary signal,
      said display synchronization signal controlling said video display rate;
   a memory control associated with each of said buffers comprising:
      means for writing the associated video source into the associated buffer in dependence upon the associated source frame rate, and,
      means for reading the associated buffer in dependence upon the memory synchronization signal to form a buffered video signal;
   a mixer for combining each of said buffered video signals to form a composite video signal having a composite frame rate equal to said video display rate, and a composite video phase equal to said video display phase,
   characterized in that said synchronization signal generating means reacts gradually to said primary signal so as not to introduce an abrupt change in the video display rate, the video display phase, the composite frame rate, nor the composite video phase.

6. An apparatus as claimed in claim 5, wherein said synchronization signal generating means includes a Phase Locked Loop.

7. An apparatus as claimed in claim 6, wherein said Phase Locked Loop has a response time characteristic greater than one second.

8. An apparatus as claimed in claim 2, wherein at least one of said video sources is characterized as containing compressed video images.

9. An apparatus as claimed in claim 5, further characterized in that at least one of said video sources has a non-constant source frame rate.

10. A method as claimed in claim 1, further characterized in that the selection of the video source to form the primary source is dependent upon the content of each of said video sources.

11. An apparatus as claimed in claim 2, wherein
   one or more of said video sources comprise sequential frames of video images, and,
   the means for selecting one of the video sources as the primary source comprises means for assessing changes in said sequential frames of video images.

12. An apparatus as claimed in claim 5, wherein
   one or more of said video sources comprise signals representing sequential video images, and,
   the means for selecting one of the video sources as the primary signal comprises means for assessing changes in said sequential video images.

* * * * *

UNITED STATES PATENT AND TRADEMARK OFFICE
CERTIFICATE OF CORRECTION

PATENT NO. : 5,914,757

DATED : June 22, 1999

INVENTOR(S) : JOHN E. DEAN et al.

It is certified that error appears in the above-indentified patent and that said Letters Patent is hereby corrected as shown below:

On the title page:

Please change inventor's name from "John D. Dean" to --John E. Dean--.

Signed and Sealed this

Sixteenth Day of November, 1999

Attest:

Q. TODD DICKINSON

*Attesting Officer*  *Acting Commissioner of Patents and Trademarks*